US008433693B2

(12) United States Patent
Rasmussen (10) Patent No.: US 8,433,693 B2
(45) Date of Patent: Apr. 30, 2013

(54) LOCKING SEMANTICS FOR A STORAGE SYSTEM BASED ON FILE TYPES

(75) Inventor: David J. Rasmussen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 631 days.

(21) Appl. No.: 11/731,929

(22) Filed: Apr. 2, 2007

(65) Prior Publication Data

US 2008/0243846 A1     Oct. 2, 2008

(51) Int. Cl.
*G06F 15/16* (2006.01)
*G06F 17/30* (2006.01)

(52) U.S. Cl.
USPC .......................................... 707/704; 709/210

(58) Field of Classification Search .................. 707/8, 9, 707/704, 694, 687, 999.008, 999.001; 726/1–3, 726/26–30; 709/210
See application file for complete search history.

(56) References Cited

U.S. PATENT DOCUMENTS

| | | | |
|---|---|---|---|
| 5,226,159 A | | 7/1993 | Henson et al. |
| 5,555,388 A | * | 9/1996 | Shaughnessy ............... 711/100 |
| 5,615,373 A | * | 3/1997 | Ho ................................ 710/200 |
| 5,978,791 A | * | 11/1999 | Farber et al. ...................... 707/2 |
| 6,032,216 A | | 2/2000 | Schmuck et al. |
| 6,192,408 B1 | | 2/2001 | Vahalia et al. |
| 6,324,581 B1 | | 11/2001 | Xu et al. |
| 6,389,420 B1 | * | 5/2002 | Vahalia et al. ......................... 1/1 |
| 6,564,215 B1 | | 5/2003 | Hsiao et al. |
| 6,675,205 B2 | | 1/2004 | Meadway et al. |
| 6,925,515 B2 | | 8/2005 | Burns et al. |
| 7,103,617 B2 | | 9/2006 | Phatak |
| 7,107,267 B2 | | 9/2006 | Taylor |
| 7,120,631 B1 | | 10/2006 | Vahalia et al. |
| 7,124,131 B2 | | 10/2006 | Guthridge et al. |
| 7,254,578 B2 | * | 8/2007 | Devarakonda et al. ............... 1/1 |
| 7,437,407 B2 | | 10/2008 | Vahalia et al. |
| 7,509,322 B2 | | 3/2009 | Miloushev et al. |
| 7,516,132 B1 | | 4/2009 | Fast et al. |
| 7,548,918 B2 | | 6/2009 | Jain et al. |
| 7,552,223 B1 | | 6/2009 | Ackaouy et al. |
| 7,627,574 B2 | | 12/2009 | Jain et al. |
| 7,634,517 B1 | | 12/2009 | Burrows et al. |
| 7,660,829 B2 | | 2/2010 | Steere et al. |
| 7,680,932 B2 | | 3/2010 | Defaix et al. |
| 7,716,182 B2 | | 5/2010 | Tewksbary |
| 7,810,027 B2 | | 10/2010 | Bendik |
| 7,849,401 B2 | | 12/2010 | Elza et al. |
| 7,877,511 B1 | | 1/2011 | Berger et al. |
| 7,921,076 B2 | | 4/2011 | Hoang et al. |
| 2002/0019874 A1 | | 2/2002 | Borr |

(Continued)

OTHER PUBLICATIONS

"Semantic File Systems", http://www.objs.com/survey/OFSExt.htm.

(Continued)

*Primary Examiner* — Jorge A Casanova (57) ABSTRACT

Techniques for implementing locking semantics for a storage system based on file types are described. An apparatus or system may include a database to store multiple data files, and a cache manager to manage the data files, the cache manager having a client lock manager to receive a request to modify a data file, determine a file type for the data file, access a set of locking semantics based on the file type, and determine whether the data file can be modified based on the locking semantics. Other embodiments are described and claimed.

20 Claims, 3 Drawing Sheets

U.S. PATENT DOCUMENTS

| | | |
|---|---|---|
| 2002/0114341 A1 | 8/2002 | Sutherland et al. |
| 2002/0120597 A1 | 8/2002 | Bae |
| 2003/0005084 A1 | 1/2003 | Humphrey |
| 2003/0145093 A1 | 7/2003 | Oren et al. |
| 2003/0154238 A1 | 8/2003 | Murphy et al. |
| 2004/0003013 A1* | 1/2004 | Coulthard et al. ............ 707/205 |
| 2004/0111422 A1* | 6/2004 | Devarakonda et al. ....... 707/100 |
| 2004/0133652 A1 | 7/2004 | Miloushev et al. |
| 2004/0172395 A1* | 9/2004 | Edelstein et al. ................. 707/9 |
| 2004/0236777 A1* | 11/2004 | Pardikar et al. ............... 707/100 |
| 2005/0251537 A1 | 11/2005 | Schwols et al. |
| 2006/0059248 A1 | 3/2006 | Ikeda |
| 2006/0064554 A1 | 3/2006 | Fridella et al. |
| 2006/0136516 A1 | 6/2006 | Jain et al. |
| 2006/0155705 A1* | 7/2006 | Kamper et al. ................... 707/8 |
| 2006/0282481 A1 | 12/2006 | Zhou et al. |
| 2007/0011667 A1 | 1/2007 | Subbiah et al. |
| 2008/0022370 A1* | 1/2008 | Beedubail et al. ................. 726/4 |
| 2008/0243847 A1* | 10/2008 | Rasmussen ....................... 707/8 |

OTHER PUBLICATIONS

Brown, et al., "SecureShare®: Guaranteed Multiprotocol File Locking", Date: Apr. 2005, http://www.netapp.com/library/tr/3024.pdf.

Unland, Rainer, "Semantics-Based Locking: From Isolation to Co-operation", Date: 1994, http.//72.14.235.104/search?q=cache:wZgywmEtnuMJ:dawis.icb.uni-due.de/fileadmin/dawis_template/main/resources/publications/arbber/ab31.ps+data+type+based+locking+semantic&hl=en&ct=clnk&cd=1&gl=in.

"SAP Net Weaver Application Server High Availability", (2005), https://www.sdn.sap.com/irj/servlet/prt/portal/prtroot/docs/library/uuid/ebc8ba02-0b01-0010-66a6-cb747fd2a962#q-2-6.

Ghemawat, et al., "TCMalloc: Thread-Caching Malloc", http://goog-perftools.sourceforge.net/doc/tcmalloc.html.

Shapiro, et al., "Scaling Optimistic Replication", (2003), pp. 164-168, vol. 2584, Publisher: Springer Berlin/Heidelberg, http://www.springerlink.com/content/qgt7kn4vhbbm00k1/.

\* cited by examiner

RECEIVE A REQUEST TO MODIFY A DATA FILE BY AN APPLICATION PROGRAM AT A CLIENT
202

DETERMINE A FILE TYPE FOR THE DATA FILE
204

ACCESS A SET OF FILE ACCESS RULES BASED ON THE FILE TYPE
206

DETERMINE WHETHER THE APPLICATION PROGRAM CAN MODIFY THE DATA FILE BASED ON THE FILE ACCESS RULES
208

LOCKING SEMANTICS FOR A STORAGE SYSTEM BASED ON FILE TYPES

RELATED CASE

The present application is related to commonly owned U.S. patent application Ser. No. 11/732,042 filed on even date titled "Separating Central Locking Services from Distributed Data Fulfillment Services in a Storage System", the entirety of which is hereby incorporated by reference.

BACKGROUND

Network storage systems and storage area networks (SAN) have developed in response to the increasing proliferation of data requirements and web services. Network storage systems generally focus on the storage, protection and retrieval of data in large-scale environments. Such massive network storage systems are sometimes referred to as mass cloud storage systems, which is a term that is used to refer to large-scale storage systems having multiple servers and infrastructure to provide various types of network services to a host of client devices. With such massive scales, bandwidth often becomes an increasingly scarce resource typically in direct proportion to the number of client devices attempting to use the services provided by the given mass cloud storage system. Consequently, techniques for improved bandwidth utilization and efficiency may be desirable for network storage systems, devices and users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to network storage systems. Some embodiments may be particularly directed to improved techniques for implementing novel locking semantics for a network storage system. A network storage system may be arranged to utilize the locking semantics to reduce network traffic between client devices and the equipment used to implement the network storage system, such as server arrays, network appliances, routers, switches and so forth. In this manner, the embodiments may improve bandwidth utilization and efficiency for a network or device.

In one embodiment, for example, an apparatus such as a network storage system may include one or more data servers arranged to store multiple data files of various types. The network storage system may further include one or more locking servers arranged to store locking information for one or more of the data files stored by the data servers. The locking information may include, for example, a version number for a data file, a lock state for the data file, a client identifier (ID) if the data file has been previously locked, and so forth. By distributing locking operations and data storage operations into different server arrays or clusters, various client devices may access locking services and data management services in a more efficient manner.

In one embodiment, for example, an apparatus such as a network storage system may include one or more client devices to communicate locking information with the locking servers. Each client device may include a database to store multiple data files with each data file having a given file or data type. Each client device may further include a cache manager to manage the data files. The cache manager may have a client lock manager to receive a request to modify a data file, determine a file type for the data file, access a set of locking semantics based on the file type, and determine whether the data file can be modified based on the locking semantics. Consequently, certain client devices may be arranged to utilize centralized locking services as provided by the locking servers for some file types and not for others. Other embodiments are described and claimed.

DETAILED DESCRIPTION

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" are not necessarily referring to the same embodiment.

Various embodiments may be directed to improved techniques for implementing novel locking semantics for a network storage system. For example, some embodiments may increase the efficiency and scalability of a network storage system by separating locking operations and data management operations into different server clusters of a server array or server farm. This facilitates scaling of the network services since bandwidth requirements to the respective server clusters can be lowered.

In one embodiment, for example, a network storage system may include one or more locking servers arranged to store locking information for one or more of data files stored by a set of data servers or client devices. The locking servers may be arranged to implement locking provisioning and data synchronization operations. When granting a write lock to a client device, the locking server and the client device need at least two pieces of information: (1) that no other client device has the write lock; and (2) the requesting client device has the latest revision of the file from the last write operation. If the requesting client device does not have the latest revision of the target file, then the client is synchronized to this revision before the lock is granted. The second condition does not necessarily require that the locking server be the provider of the bits to get the requesting client device up-to-date. In fact, the second condition does not necessarily require the locking server to store the data file at all.

The locking servers may manage lock operations for the various client devices and file versions using a unique file identifier. Each version of a data file has an associated ID referred to as a globally unique identifier (GUID). The locking server stores the GUID for the latest revision of a data file along with the current state of the lock. The lock state information may indicate, for example, whether the file is currently locked, and if so by which client device. If a client device does not yet have this revision, it triggers synchronization operations to get this revision from one or more of its peers that have the particular revision, or a central data server (not necessarily the locking server) in the absence of available peers. Once the client device is in synchronization then the lock can be granted. When a client has completed a write operation it contacts the locking server to release the lock, and provides a new GUID that represents the current revision of the file. The client device also stores the new GUID along with the revised data file. It is replicated along with the file. In this manner, the locking servers may manage locking operations for a relatively large number of client devices, while reducing associated bandwidth requirements.

In addition to distributing locking operations and data management operations, massive scale for the network storage system 100 could be feasibly achieved by implementing different locking semantics, rules, operations or solutions for client devices based on different file types. For example, some file types may absolutely need centralized locking services, other file types may prefer using centralized locking services but are not necessarily limited to using such services, while other file types have no need for centralized locking services at all. Consequently, certain client devices may be arranged to utilize centralized locking services as provided by the locking servers for some file types and not for others.

Various embodiments differentiate locking semantics by file or data types. Recognizing that the largest and most frequently accessed files (e.g., video, photo and music files) are also largely immutable, and therefore more tolerant of forking, these files can be treated as immutable with the locking semantics provided by the network storage system. Other data types such as database files, however, are typically not immutable (i.e. they are changed often) and will not tolerate forking well because they have strict requirements on integrity and consistency across the entire file which must remain a single unit. Consequently, such files should have strict central locking semantics. Yet other data types can be treated with an intermediate or hybrid locking approach. By differentiating locking by data type, the network storage system may provide network scaling flexibility, and allow each different file type to be treated in the most appropriate manner for a desired level of user experience.

Figure 1:
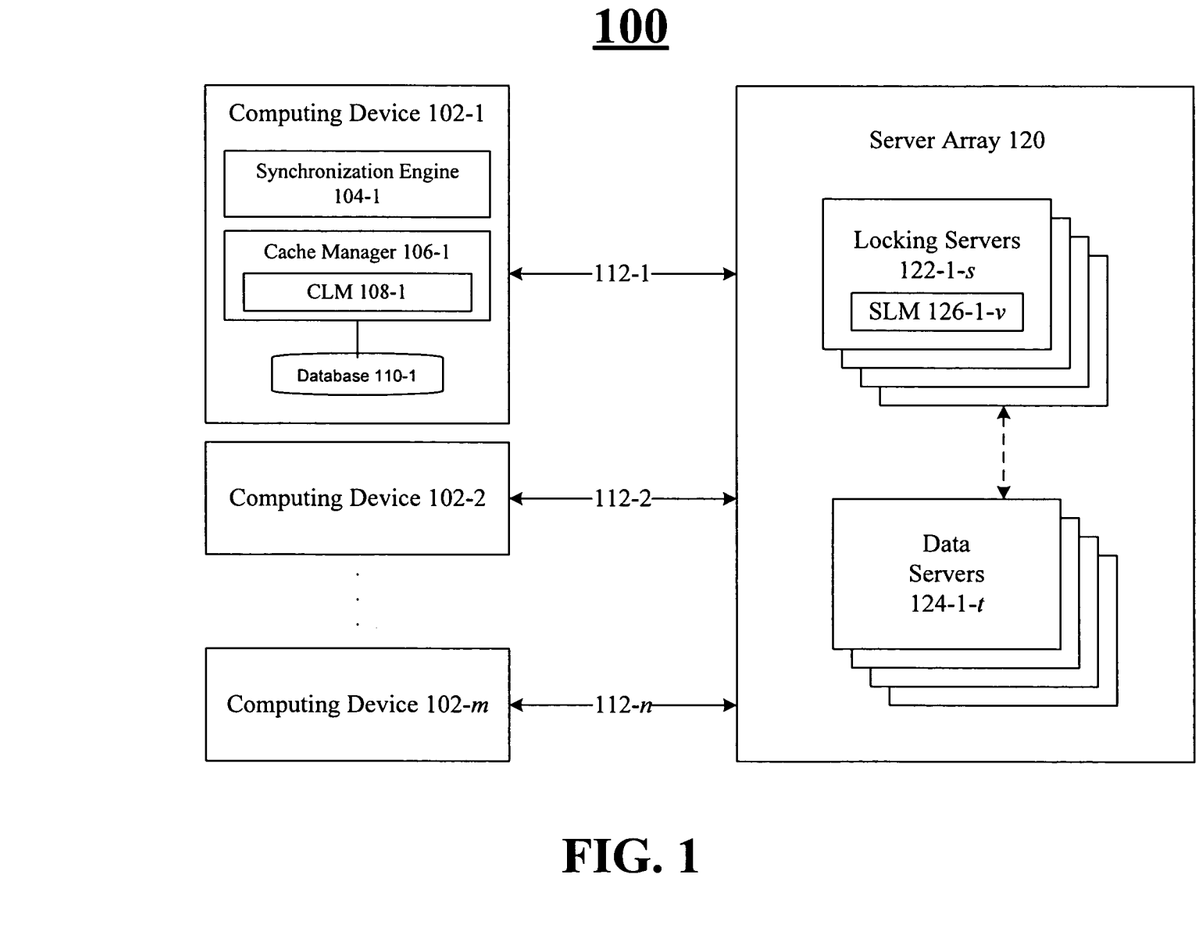
FIG. 1 illustrates one embodiment of a network storage system.

FIG. 1 illustrates a block diagram of a network storage system 100. The network storage system 100 may represent a wired or wireless communication system. As shown in FIG. 1, one embodiment of the network storage system 100 may include one or more client devices 102-1-*m* communicatively coupled to a server array 120 via one or more wired or wireless connections 112-1-*m*. The server array 120 may include one or more locking servers 122-1-*s* and one or more data servers 124-1-*t*. In some implementations, the locking servers 122-1-*s* and data servers 124-1-*t* may be communicatively coupled, and in others the locking servers 122-1-*s* and data servers 124-1-*t* may be completely separate with no connectivity. Each of the client devices 102-1-*m* may include various other elements. As shown in the exploded view of the representative client device 102-1, for example, each of the client devices 102-1-*m* may include a synchronization engine 104-1-*m*, a cache manager 106-1-*m*, a client lock manager 108-1-*m*, and a database 110-1-*m*.

In various embodiments, the network storage system 100 may include the server array 120. The server array 120 may comprise multiple servers and other network infrastructure for providing network storage services or mass cloud storage services for the client devices 102-1-*m*. In one embodiment, for example, the server array 120 may be implemented as a server farm. A server farm is a collection of computer servers usually maintained by an enterprise to accomplish server needs far beyond the capability of one machine. Server farms are typically co-located with the network switches and/or routers which enable communication between the different parts of the cluster and the users of the cluster. Server farms are commonly used for large-scale computing operations, such as cluster computing, web hosting, web services, massive parallel processing operations, and so forth. Because of the sheer number of computers in larger server farms the failure of individual machines is a commonplace event, and therefore management of large server farms typically provide support for redundancy, automatic failover, and rapid reconfiguration of the server cluster.

In various embodiments, mass cloud storage systems and techniques may be applicable for large scale network storage systems implemented as storage area networks (SAN). Further, mass cloud storage systems and techniques may be implemented as storage systems provided over a packet network (such as the Internet) via a Wide Area Network (WAN) and across large geographies into massive hosted data centers. Mass cloud storage systems generally provide storage services to consumers, clients or operators on the order of millions or more. These would typically be publicly available commercial storage services.

The mass cloud storage services provided by the server array 120 may be implemented for various use scenarios. For example, the server array 120 may be used to implement user state portability where a single operator utilizes multiple devices. User state portability allows for shared state and/or data across multiple user machines and devices, backup and restore operations, machine migration services, roaming state when logged into "public" machines, and so forth. In another example, the server array 120 may be used to implement data sharing operations where there is a single author and multiple readers or consumers. Data sharing operations may be desirable when a single author shares multimedia information (e.g., photos, music, videos, etc.) with others, or for personal publishing (e.g., web site, blogs, podcasting, etc.). In yet another example, the server array 120 may be used to support collaboration efforts involving multiple authors. Collaboration efforts may include multi-user content creation/editing.

To support these and other scenarios, the server array 120 may communicate information with the client devices 102-1-*m* via the wired or wireless connections 112-1-*n*, where shared data is cached locally on each of the client devices 102-1-*m*. A file system driver may be implemented for each of the client devices 102-1-*m* to handle redirection to the local cache and populating it from the mass cloud storage service such that any application programs above it need not be aware of the specifics of the service and require no knowledge of the underlying data synchronization operations.

In one embodiment, for example, the client device 102-1 illustrates a synchronization engine 104-1 and a cache manager 106-1 to perform data synchronization operations between the client device 102-1 and the server array 120. In this manner, the client devices 102-1-*m* may take advantage of any centralized services provided by the server array 120, such as discovery operations, seeding operations, locking operations, and so forth. The synchronization engine 104-1 and the cache manager 106-1 may also perform peer-to-peer data synchronization operations between the client device 102-1 and the other client devices 102-2-*m*. The peer-to-peer data synchronization operations may be useful for scale efficiency, which may be particularly important due to the larger number of devices implemented for the network storage system 100.

In various embodiments, the network storage system 100 may implement various techniques for performing cache consistency and locking operations. Maintaining cache consistency in a mass cloud storage environment, however, can be quite challenging. In a multi-client scenario, one or more operators may create or edit data files on multiple client devices 102-1-*m*. In some cases, multiple operators may create or edit data files potentially simultaneously or between synchronization operations. Further, the client devices 102-1-*m* may not always be able to access each other for various reasons, such as lack of network connectivity, device powered off, and so forth.

System designs for distributed or cached file systems can address this challenge in various ways. For example, data files may be treated as immutable where the data files are never changed, and modification of an existing file just adds a new forked copy of the original file. There are only file additions and deletions in this case. In another example, different versions of the same data file may be merged on behalf of an application program. In this case, the platform is aware of a file format for the data file and uses this knowledge to merge the data files at synchronization time if the data file has been modified in two places. In yet another example, customized or application specific merge operations may be performed for different versions of the same data file. When the platform detects a file conflict, it calls a format specific merge provider registered by the owning app. In still another example, a centralized file locking technique may be implemented. The platform provides centralized file locking, so that only one device can write at a time and must be in synchronization prior to write operations. Readers can be out of date, but writers never unknowingly write over each other.

Each of these cache consistency solutions, however, has associated limitations. For example, merging data files at synchronization time by the platform may be impractical for the network storage system 100 due to the large-scale implementation size. They are impractical because they either require the providers of the platform technology to be aware of every possible file format and engineer suitable merging algorithms, or they require each application developer to write a merge provider that complies with that synchronization platform. Writing merge algorithms that converge well with multiple peers is very difficult. So it is highly unlikely that application developers will write merge providers for all the potentially different file formats. With respect to treating files as immutable, this solution may be appropriate for a narrow set of scenarios, but may create undesired results when applied universally. If the platform encounters a conflict for immutable files, it forks the file into two separate files. Once the file is forked it can be very difficult for the user to merge and resolve, thereby leading to something that feels equivalent to data loss for the user. This approach may be suitable if conflicts are infrequent, such as when users do not actively use files on more than one machine and they are careful when transitioning between machines, but may be unsuitable for active users with multiple machines. This approach is not suitable, however, for files that are modified relatively often by an application program, such as files for MICROSOFT® OUTLOOK® or MICROSOFT ONENOTE, for example. Forcing a user to repeatedly reconcile two copies of these files may be undesirable from a user perspective, and in some cases, is sometimes impossible. This problem compounds significantly with multiple users. If a service used this approach it would either need to significantly restrict user scenarios or expect a very poor user experience and subsequent loss of user trust. In either case this would limit business success.

Centralized locking provides several advantages for maintaining cache consistency, although it has some associated disadvantages as well. Some disadvantages include difficulty in scaling, especially if centralized locking is tied to centralized storage and access of the actual data. Another challenge is how users can modify data when not connected to the centralized server. A benefit of centralized locking, however, is that applications do not need to be rewritten. Existing applications are designed to work with locks on network file storage. Some application programs, such as MICROSOFT WORD, provide a read-only copy of the file to other users if another client already has a write lock. Other application programs, such as MICROSOFT ONENOTE, use locking techniques to manage merging of changes among multiple clients. In both cases, the application developer and the user experience is familiar and understood. But not all scenarios and file types require centralized locking support. The requirements are somewhat specific to the scenario and file type.

In various embodiments, massive scale for the network storage system 100 could be feasibly achieved by a hybrid solution implementing two key features. First, the locking operations may be separated from the data storage operations thereby distributing user loads for the server array 102. Second, different locking operations or solutions may be implemented for the client devices 102-1-*m* based on the different file types stored by the client devices 102-1-*m* and/or the server array 120.

Distributed Locking Operations

In various embodiments, massive scale for the network storage system 100 could be feasibly achieved by separating locking operations from the data storage operations thereby distributing user loads for the server array 102. In some embodiments, the server array 120 may provide various centralized services to the client devices 102-1-*m*, such as data storage operations and data file locking operations for the client devices 102-1-*m*. To increase efficient delivery of these services, the server array 120 may implement each class of operations in different server clusters. As shown in FIG. 1, for example, the server array 120 may include one or more locking servers 122-1-*s*, and one or more data servers 124-1-*t*. By distributing locking operations and data storage operations into different server arrays or clusters, various client devices may access locking services and data management services in a more efficient manner.

In various embodiments, the data servers 124-1-*t* may be arranged to perform various shared data storage or distributed file management operations for information or data operated on by the client devices 102-1-*m*. For example, the data servers 124-1-*t* may be arranged to store multiple data files or records of various types. The term data files may include any discrete set of information or data stored by an electronic device. Examples of data files may include word processing documents, spreadsheet documents, multimedia files (e.g., audio, video, images, photographs, etc.), and so forth. The data files may be periodically synchronized with local copies of the data files stored by the client devices 102-1-*m*, such as in the database 110-1 as managed by the cache manager 106-1 of the client device 102-1, for example.

In various embodiments, the locking servers 122-1-*s* may be arranged to perform various locking operations for the client devices 102-1-*m*. For example, the locking servers 122-1-*s* may be arranged to store locking information for one or more of the data files stored by the data servers 124-1-*t*. The locking information may include without limitation, for example, a version number for a data file, a lock state for the data file, a client ID if the data file has been previously locked, general locking semantics or rules for the client devices 102-1-*m*, unique locking semantics or rules for certain of the client devices 102-1-m, and so forth. Although the various embodiments in general, and the locking servers 122-1-s in particular, may be described as implementing locking semantics or rules for basic read and write locks for a data file, it may be appreciated the embodiments may be implemented for other type of locks or permissions that could be granted to different client devices. For example, the locking semantics may be similarly applied to security operations, authentication operations, controlled user access, and so forth. The embodiments are not limited in this context.

In various embodiments, the locking servers 122-1-s may each include respective server lock managers 126-1-v. The server lock managers 126-1-v may be arranged to interact with the client lock managers 108-1-m to manage lock operations for data files stored by the client devices 102-1-m and/or the data servers 124-1-t. The lock operations may include locking a data file for read operations, write operations, read/write operations, and so forth.

In various embodiments, the lock operations may be implemented using unique identifiers for each version of a data file. In one embodiment, for example, a server lock manager 126-1-v may store a first identifier for a data file. The first identifier may comprise an identifier representing a most current version for the data file known by the server lock manager 126-1-v. Assume a client device 102-1-m desires to modify a local version of the data file stored by the respective database 110-1-m. The client lock manager 108-1-m of the cache manager 106-1-m that manages the local version of data file may send a lock request to lock the data file with a second identifier for the data file to the locking servers 122-1-s. The server lock manager 126-1-v may receive the lock request to lock the data file with the second identifier from a client device 102-1-m. The second identifier may comprise an identifier representing a most current version for the data file known by the client lock manager 108-1-m. The server lock manager 126-1-v may compare the first identifier with the second identifier, and send a lock request response to the client lock manager 108-1-m. The lock request response may have control information granting the lock request if the first and second identifiers match, and denying the lock request if the first and second identifiers do not match.

If the first and second identifiers fail to match, then the server lock manager 126-1-v may also include instructions to retrieve an updated version of the data file in the lock request response sent to the client device 102-1-m. The client device 102-1-m receives a lock request response granting the lock request or denying the lock request based on the first identifier from the locking server 122-1-s. If the client device 102-1-m receives the lock request response indicating the previous lock request has been denied by the server array 120, the lock request response may also include control information indicating that a local version of the data file stored in the database 110-1-m of the client device 102-1-m is not the most current version of the data file for which the lock request was denied. The synchronization engine 104-1-m of the respective client device 102-1-m may synchronize the local version of a data file with a server version of the data file stored by the data servers 124-1-t in response to instructions received from the locking server. Alternatively, the synchronization engine 104-1-m of the respective client device 102-1-m may synchronize the local version of a data file with another local version of the data file stored by another client device 102-1-m using a peer-to-peer distributed file management technique. Once the client device 102-1-m has the most current version of a data file, then the locking server 122-1-s may grant the write lock to the client device 102-1-m.

By way of example, assume that the network storage system 100 is a mass cloud storage system arranged to implement locking provisioning and data synchronization operations for a relatively large number of client devices. When granting a write lock to a client device 102-1-m, the locking server 122-1-s and the client device 102-1-m need at least two pieces of information: (1) that no other client device has the write lock; and (2) the requesting client device has the latest revision of the file from the last write operation. If the second condition is not met, then the client needs to be synchronized to this revision before the lock can be granted. It may be appreciated that the second condition does not necessarily require that the lock server 122-1-s be the provider of the bits to get the requesting client device up-to-date. In fact, the second condition does not necessarily require the locking server 122-1-s to store the data file at all.

Continuing with this example, assume each file revision has an associated GUID. The locking server 122-1-s stores the GUID for the latest revision of the file along with the current state of the lock. The lock state information may indicate, for example, whether the file is currently locked, and if so by which client device. If a client device does not yet have this revision it triggers synchronization operations to get this revision from one or more of its peers that have the particular revision, or a central data server (e.g., the data servers 124-1-t) in the absence of available peers. Once the client device is in synchronization then the lock can be granted. When a client has completed a write operation it contacts the locking server 122-1-s to release the lock, and provides a new GUID that represents the current revision of the file. The client device also stores the new GUID along with the revised data file. It is replicated along with the file.

Synchronization operations for data files with different versions may be performed in a number of different ways. For example, synchronization operations may be performed by using binary deltas to gradually update only that information for the data file that has been changed. In another example, synchronization operations may be performed by moving whole files across the network between devices. Presuming a client device is often connected, and synchronization is achieved using binary deltas rather than moving whole files, then the writing client is probably already up to date at the time it needs a write lock, or it could be a relatively quick operation.

When a lock is granted to a client device, then various lock protection schemes may be implemented to make sure the system does not have undesired behavior. In one embodiment, for example, a client device may be arranged to synchronize a modified data file up to a central data server (e.g., the data servers 124-1-t) immediately after it completes a write. This may prevent a scenario from occurring where a client device updates the revision GUID on the locking server 122-1-s, and then immediately dies or goes out of service, thereby preventing other client devices from being able to write to the file because it will be unable to get the current revision before writing. In another embodiment, for example, the locking servers 122-1-s may be arranged to allow a given lock to a data file to expire or time out if not periodically refreshed.

File Differentiated Locking Semantics

As previously described, massively scaling storage on an Internet scale is difficult. Often peer-to-peer or local caching techniques are used to improve scale and performance. Such techniques may introduce, however, challenges of client consistency and lock behaviors. For scale, some systems have locking behaviors that treat files as immutable. If a user on one client attempts to change a file at the same time that another client changes the same file, then two separate files are forked off from the original data file at the next replication time. This can lead to a bad user experience. On the other hand, some locally cached systems use central locks, with local cached files replicating off the central file server. This inhibits scaling because of the load on the central servers. Such problems are created when a system attempts to use the same set of locking semantics for every type of data file. The trade-off is either a poor user experience with conflicting and diverging duplication of files, poor scalability of the infrastructure, or lack of ability to edit files while offline from the central locking servers. It is worthy to note that immutable file treatment allows editing while offline, while central locking requirements means an operator or user needs to access a central server and cannot edit offline.

Various embodiments attempt to solve these and other problems. In some embodiments, massive scale for the network storage system 100 could be feasibly achieved by implementing different locking semantics, rules, operations or solutions for the client devices 102-1-$m$ based on the different file types stored by the client devices 102-1-$m$ and/or the server array 120. For example, some file types may absolutely need centralized locking services, other file types may prefer using centralized locking services but are not necessarily limited to using such services, while other file types have no need for centralized locking services at all. Consequently, the client devices 102-1-$m$ may be arranged to utilize centralized locking services as provided by the locking servers 122-1-$s$ of the server array 120 for some file types and not for others.

Various embodiments differentiate locking semantics by file or data types. Recognizing that the largest and most frequently accessed files are also largely immutable (e.g. video, music and photos), and therefore more tolerant of forking, these files can be treated as immutable with the locking semantics provided by the network storage system 100. Other data types such as database files, however, are typically not immutable and will not tolerate forking well. Consequently, such files should have strict central locking semantics. Yet other data types can be treated with an intermediate or hybrid locking approach. By differentiating locking by data type, the network storage system 100 may provide network scaling flexibility, and allow each different file type to be treated in the most appropriate manner for a given user experience.

In various embodiments, the client lock manager 108-1 may be arranged to apply different sets of locking semantics or file access rules based on a file type for a given data file stored by the database 110-1 to fulfill a given set of scenario requirements. In various embodiments, the data files may have various file types. The various file types may be generally categorized into three classes or categories, to include: (1) an immutable file type; (2) a locking required file type; and (3) a locking preferred file type. Each file type is given a default categorization initially set by the platform provider, but it could be custom configured by application programs, information technology staff, system designers, or individual users, to cover new types. Although some embodiments may utilize only three classes of file types by way of example, any number of classification or categorization techniques may be used to group or classify file types for a given set of locking semantics.

A first example of a file type may include an immutable file type. Immutable files are accessed often but generally not edited. Conveniently they include many of the larger file types, namely photos, music and video. For these file types it is acceptable that an edited file is treated as creation of a new file followed by a deletion of the original file. Pure peer-to-peer solutions can be used for distribution because this is nicely convergent for immutable files. Immutable files typically do not require locking services from a central server. Consequently, separating this class of files out greatly increases the likelihood that the network storage system 100 can scale as new client devices enter the system.

A second example of a file type may include a locking required file type. Locking required files are typically data files such as database files, for which integrity requirements are more important than offline write access. For example, MICROSOFT OUTLOOK® or MICROSOFT ONENOTE files would fit into this category because it provides its own offline cache (e.g., database 110-1) managed by the cache manager 106-1, and can perform correct merge of different file versions if the client lock manager 108-1 under it provides correct locking semantics when it is online. It is worthy to note that the requirement for centralized locking as provided by the locking servers 122-1-$s$ does not necessarily mean that distribution of the data itself has to be centralized, and could be provided by the data servers 124-1-$t$. This separation of centralized locking from distributed data synchronization also improves scalability as previously described.

A third example of a file type may include a locking preferred file type. Locking preferred files might typically include data files such as MICROSOFT WORD documents. Locking preferred files are files that are typically not edited by multiple users and/or machines between synchronizations, but sometimes can be. Treating them as immutable files can lead to undesirable file forking scenarios, thereby degrading the user experience. Some user scenarios, however, do require the ability to edit offline, and often that will result in no conflict. Consequently, one solution is to have a locking preferred category. If the central locking service is available, then locks will be requested and respected. If the client is offline, the requesting application program will be granted a write lock anyway. As a result, conflicts and the corresponding poor user experience can be reduced significantly, particularly as connectivity solutions are increasing over time. The result is a better user experience. Again the ability to separate centralized locking from distributed data synchronizing improves scalability for these file types as well.

In various embodiments, the client lock manager 108-1 of the client device 102-1 may apply different sets of locking semantics or file access rules for the three different file types previously described. In one embodiment, for example, the client lock manager 108-1 may receive a request to modify a data file. The request may be sent, for example, by an application program residing and executed by the client device 102-1. The client lock manager 108-1 may determine a file type for the data file. The client lock manager 108-1 may access a set of locking semantics based on the file type. The client lock manager 108-1 may determine whether the data file can be modified based on the locking semantics. In this manner, the client lock manager 108-1 may provide differentiated locking services according to file or data type to provide a desired trade off between user experience and infrastructure scaling In one embodiment, for example, the client lock manager 108-1 may determine that the file type is an immutable file type. The client lock manager 108-1 may grant permission to modify the data file without needing to send a locking request to a locking server 122-1-$s$. Consequently, an application program may modify an immutable file whether in an online or offline mode. This may reduce bandwidth consumption for the network connection 112-1, as well as the user load for the locking server 122-1-$s$.

In one embodiment, for example, the client lock manager 108-1 may determine that the file type is a locking required file type. For a locking required file type, the client device 102-1 needs to be in an online mode to grant write locks to a requesting application program. If the client device 102-1 is in an offline or unconnected mode, the client lock manager 108-1 may automatically deny permission to a requesting application to modify the target data file since access to centralized locking services are not possible. When in an online or connected mode, however, the client device 102-1 may establish a network connection to a locking server 122-1-s using a wired or wireless connection 112-1 (e.g., using a network interface, radio or transceiver), and request locking instructions from the locking server 122-1-s over the network connection 112-1. The request for locking instructions may include sending a lock request with an identifier to the locking server 122-1-s, the locking server 122-1-s comparing the received identifier with an identifier stored by the locking server 122-1-s, and the locking server 122-1-s sending a lock request response with locking instructions indicating whether the lock request was granted or denied, as previously described with reference to the distributed locking operation embodiments. The client lock manager 108-1 may provide a response to the request to modify received from the application program based on the locking instructions received from the locking server 122-1-s.

In one embodiment, for example, the client lock manager 108-1 may determine that the file type is a locking preferred file type. For a locking preferred file type, the client device 102-1 determines whether a network connection is available. If a network connection is available, such as the network connection 112-1, then the centralized locking services provided by the locking servers 122-1-s are requested and respected, similar to the locking required file type locking semantics. Unlike the locking required file type locking semantics, however, the client device 102-1 may still grant permission to modify the data file without needing to send a locking request to a locking server 122-1-s when in an offline or unconnected mode. In this manner, the locking semantics are a hybrid or blend of the locking semantics for locking required file types and immutable file types.

Operations for the network storage system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the network storage system 100 or alternative elements as desired for a given set of design and performance constraints.

Figure 2:
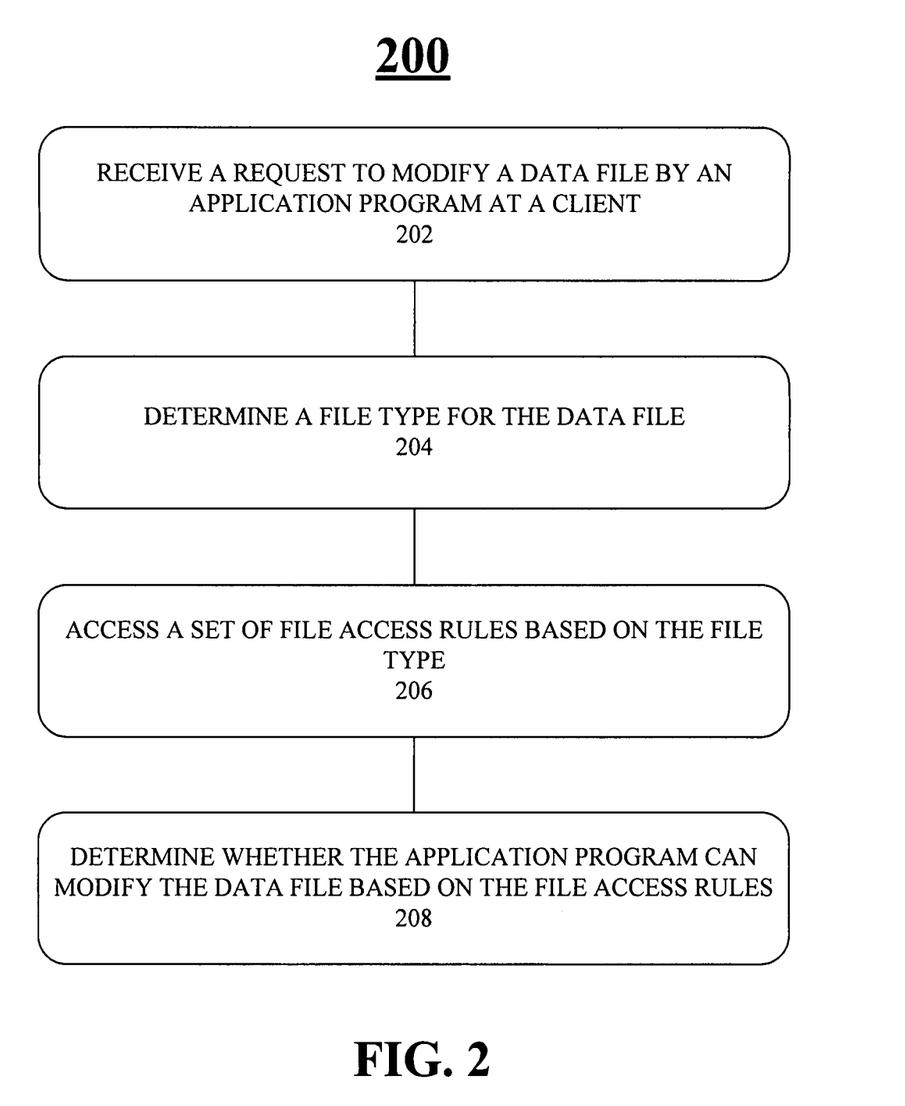
FIG. 2 illustrates one embodiment of a logic flow.

FIG. 2 illustrates a logic flow 200. Logic flow 200 may be representative of the operations executed by one or more embodiments described herein. As shown in FIG. 2, the logic flow 200 may receive a request to modify a data file by an application program at a client at block 202. The logic flow 200 may determine a file type for the data file at block 204. The logic flow 200 may access a set of file access rules based on the file type at block 206. The logic flow 200 may determine whether the application program can modify the data file based on the file access rules at block 208. The embodiments are not limited in this context.

The logic flow 200 may be implemented, for example, by a client device 102-1-m. In one embodiment, for example, the client lock manager 108-1 may determine the file type is an immutable file type. The client lock manager 108-1 may grant permission to the application program to modify the file. The client lock manager 108-1 may grant permission, for example, by granting a write lock to the application program.

In one embodiment, for example, the client lock manager 108-1 may determine the file type is a locking required file type. The client lock manager 108-1 may determine whether a network connection (112) to a locking server (122) is available. The client lock manager 108-1 may deny permission to modify the file when the network connection (112) is not available. The client lock manager 108-1 may deny permission, for example, by denying a write lock to the application program.

In one embodiment, for example, the client lock manager 108-1 may determine the file type is a locking required file type. The client lock manager 108-1 may determine whether a network connection (112) to a locking server (122) is available. The client lock manager 108-1 may send a lock request to lock the data file to the locking server (122) when the network connection (112) is available. The client lock manager 108-1 may grant permission to modify the file when the lock request is granted by the locking server (122).

In one embodiment, for example, the client lock manager 108-1 may determine the file type is a locking required file type. The client lock manager 108-1 may determine whether a network connection (112) to a locking server (122) is available. The client lock manager 108-1 may send a lock request to lock the data file to the locking server (122) when the network connection (112) is available. The client lock manager 108-1 may deny permission to modify the file when the lock request is denied by the locking server (122).

In one embodiment, for example, the client lock manager 108-1 may determine the file type is a locking preferred file type. The client lock manager 108-1 may determine whether a network connection (112) to a locking server (122) is available. The client lock manager 108-1 may grant permission to modify the file when the network connection (112) is not available.

In one embodiment, for example, the client lock manager 108-1 may determine the file type is a locking preferred file type. The client lock manager 108-1 may determine whether a network connection (112) to a locking server (122) is available. The client lock manager 108-1 may send a lock request to lock the data file to the locking server (122) when the network connection (112) is available. The client lock manager 108-1 may grant permission to modify the file when the lock request is granted by the locking server (122).

In one embodiment, for example, the client lock manager 108-1 may determine the file type is a locking preferred file type. The client lock manager 108-1 may determine whether a network connection (112) to a locking server (122) is available. The client lock manager 108-1 may send a lock request to lock the data file to the locking server (122) when the network connection (112) is available. The client lock manager 108-1 may deny permission to modify the file when the lock request is denied by the locking server (122).

Figure 3:
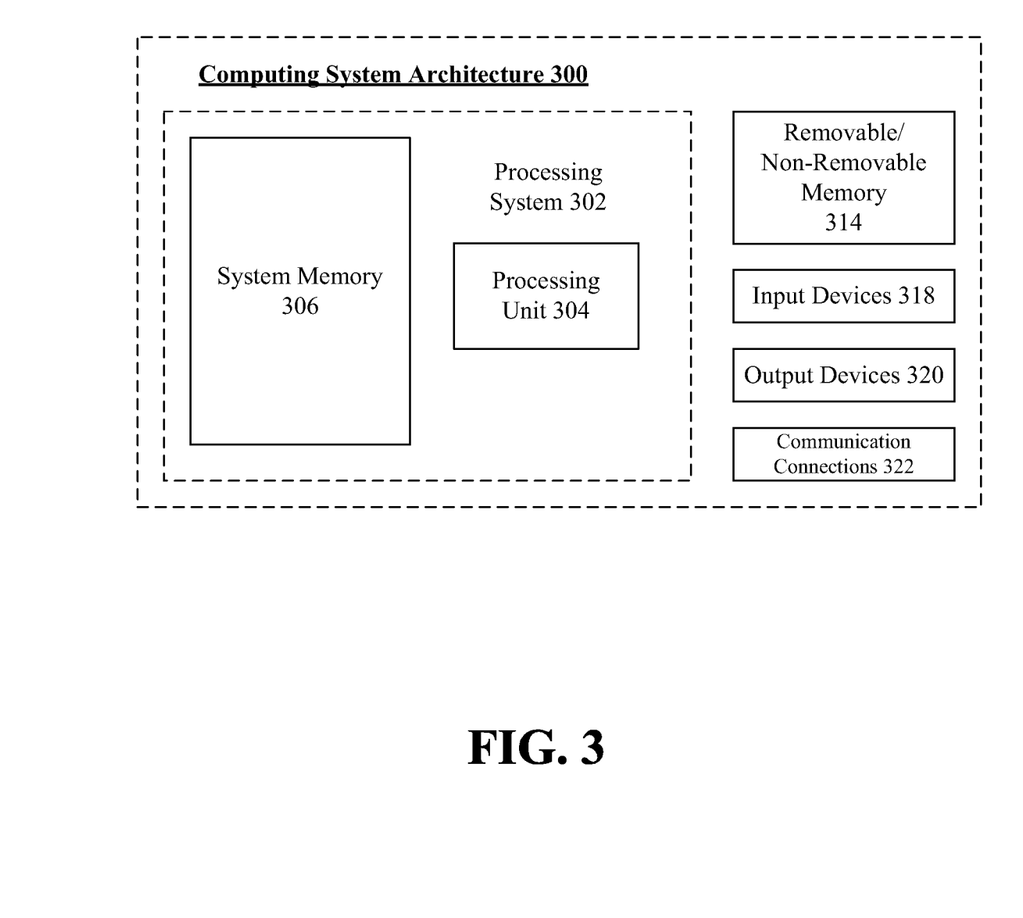
FIG. 3 illustrates one embodiment of a computing system architecture.

FIG. 3 illustrates a computing system architecture 300. The computing system architecture 300 may represent a general system architecture suitable for implementing various embodiments, such as the client devices 102-1-m, the locking servers 122-1-s, the data servers 124-1-t, and so forth. As shown in FIG. 3, the computing system architecture 300 may include multiple elements, including hardware elements, software elements, or software and hardware elements. Although the computing system architecture 300 as shown in FIG. 3 has a limited number of elements in a certain topology, it may be appreciated that the computing system architecture 300 may include more or less elements in alternate topologies as desired for a given implementation. The embodiments are not limited in this context.

In various embodiments, the computing system architecture 300 typically includes a processing system of some form. In its most basic configuration, the computing system architecture 300 may include a processing system 302 having at least one processing unit 304 and system memory 306. Processing unit 304 may include one or more processors capable of executing software, such as a general-purpose processor, a dedicated processor, a media processor, a controller, a microcontroller, an embedded processor, a digital signal processor (DSP), and so forth. System memory 306 may be implemented using any machine-readable or computer-readable media capable of storing data, including both volatile and non-volatile memory. For example, system memory 306 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

As shown in FIG. 3, system memory 306 may store various software programs. For example, the system memory 306 may store one or more application programs and accompanying data. In another example, the system memory 306 may store one or more OS and accompanying data. An OS is a software program that manages the hardware and software resources of a computer. An OS performs basic tasks, such as controlling and allocating memory, prioritizing the processing of instructions, controlling input and output devices, facilitating networking, managing files, and so forth. Examples of a suitable OS for the computing system architecture 300 may include one or more variants of MICROSOFT WINDOWS®, as well as others.

The computing system architecture 300 may also have additional features and/or functionality beyond processing system 302. For example, the computing system architecture 300 may have one or more removable and/or non-removable memory units 314. In another example, the computing system architecture 300 may also have one or more input devices 318 such as a keyboard, mouse, pen, voice input device, touch input device, and so forth. In yet another example, the computing system architecture 300 may further have one or more output devices 320, such as a display, speakers, printer, and so forth. In still another example, the computing system architecture 300 may also include one or more communications connections 322. It may be appreciated that other features and/or functionality may be included in the computing system architecture 300 as desired for a given implementation.

In various embodiments, the computing system architecture 300 may further include one or more communications connections 322 that allow the computing system architecture 300 to communicate with other devices. Communications connections may be representative of, for example, the connections 112-1-n. Communications connections 322 may include various types of standard communication elements, such as one or more communications interfaces, network interfaces, network interface cards, radios, wireless transceivers, wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

In various embodiments, the computing system architecture 300 may further include one or more memory units 314. Memory unit 314 may comprise any form of volatile or non-volatile memory, and may be implemented as either removable or non-removable memory. Examples of memory unit 314 may include any of the memory units described previously for system memory 306, as well as others. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously provided for the memory units 306, 314. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   receiving a request to modify a data file by an application program at a client device;
   determining a file type for the data file where the file type is one of an immutable file type, a locking required file type, and a locking preferred file type;
   accessing a set of file access rules based on the file type; and
   determining whether the application program has permission to modify the data file based on the file access rules, wherein the file access rules require a network connection to a locking server for editing when the file type is the locking required file type, the file access rules do not require the network connection to the locking server for editing when the file type is the immutable file type, and the file access rules for the locking preferred file type only require the network connection to the locking server for editing when the network connection to the locking server is available, wherein a lock is granted to the application program if the file type is the locking preferred file type and the network connection to the locking server is not available.

2. The method of claim 1, comprising:
   determining the file type is an immutable file type; and
   granting permission to the application program to modify the file by the client.

3. The method of claim 1, comprising:
   determining the file type is a locking required file type;
   determining whether a network connection to a locking server is available; and
   denying permission to modify the file when the network connection is not available.

4. The method of claim 1, comprising:
   determining the file type is a locking required file type;
   determining whether a network connection to a locking server is available;
   sending a lock request to lock the data file to the locking server when the network connection is available; and
   granting permission to modify the file when the lock request is granted by the locking server.

5. The method of claim 1, comprising:
   determining the file type is a locking required file type;
   determining whether a network connection to a locking server is available;
   sending a lock request to lock the data file to the locking server when the network connection is available; and
   denying permission to modify the file when the lock request is denied by the locking server.

6. The method of claim 1, comprising:
   determining the file type is a locking preferred file type;
   determining whether a network connection to a locking server is available; and
   granting permission to modify the file when the network connection is not available.

7. The method of claim 1, comprising:
   determining the file type is a locking preferred file type;
   determining whether a network connection to a locking server is available;
   sending a lock request to lock the data file to the locking server when the network connection is available; and
   granting permission to modify the file when the lock request is granted by the locking server.

8. The method of claim 1, comprising:
   determining the file type is a locking preferred file type;
   determining whether a network connection to a locking server is available;
   sending a lock request to lock the data file to the locking server when the network connection is available; and
   denying permission to modify the file when the lock request is denied by the locking server.

9. An article comprising a storage media which excludes signals per se containing instructions that when executed, causes a processor system to:
   receive a request to modify a data file by an application program;
   determine a file type for the data file where the file type is one of an immutable file type, a locking required file type, and a locking preferred file type;
   access a set of locking semantics based on the file type; and
   determine whether the application program has permission to modify the data file based on the locking semantics, wherein the locking semantics require a network connection to a locking server for editing when the file type is the locking required file type, the locking semantics do not require the network connection to the locking server for editing when the file type is the immutable file type, and the locking semantics for the locking preferred file type only require the network connection to the locking server for editing when the network connection to the locking server is available, wherein a lock is granted to the application program if the file type is the locking preferred file type and the network connection to the locking server is not available.

10. The article of claim 9, further comprising instructions that when executed, causes a processor system to:
    determine the file type is an immutable file type; and
    grant permission to the application program to modify the file.

11. The article of claim 9, further comprising instructions that when executed, causes a processor system to:
    determine the file type is a locking required or a locking preferred file type;
    determine a network connection to a locking server is available;
    request locking instructions from the locking server; and
    provide a response to the request to modify based on the locking instructions.

12. The article of claim 9, further comprising instructions that when executed, causes a processor system to:
    determine the file type is a locking required file type;
    determine whether a network connection to a locking server is available; and
    deny permission to modify the file when the network connection is not available.

13. The article of claim 9, further comprising instructions that when executed, causes a processor system to:
    determine the file type is a locking required file type;
    determine whether a network connection to a locking server is available;
    send a lock request to lock the data file to the locking server when the network connection is available;
    grant permission to modify the file when the lock request is granted by the locking server; and deny permission to modify the file when the lock request is denied by the locking server.

14. The article of claim 9, further comprising instructions that when executed, causes a processor system to:
   determine the file type is a locking preferred file type;
   determine whether a network connection to a locking server is available; and
   grant permission to modify the file when the network connection is not available.

15. The article of claim 9, further comprising instructions that when executed, causes a processor system to:
   determine the file type is a locking preferred file type;
   determine whether a network connection to a locking server is available;
   send a lock request to lock the data file to the locking server when the network connection is available;
   grant permission to modify the file when the lock request is granted by the locking server; and
   deny permission to modify the file when the lock request is denied by the locking server.

16. An apparatus comprising:
   a database to store multiple data files on a storage medium; and
   a cache manager to manage the data files, the cache manager having a client lock manager to receive a request to modify a data file, determine, by a processor, a file type for the data file where the file type is one of an immutable file type, a locking required file type, and a locking preferred file type, access a set of locking semantics based on the file type, and determine whether the data file is permitted to be modified based on the locking semantics, wherein the locking semantics require a network connection to a locking server for editing when the file type is the locking required file type, the locking semantics do not require the network connection to the locking server for editing when the file type is the immutable file type, and the locking semantics for the locking preferred file type only require the network connection to the locking server for editing when the network connection to the locking server is available, wherein a lock is granted if the file type is the locking preferred file type and the network connection to the locking server is not available.

17. The apparatus of claim 16, the client lock manager to determine the file type is an immutable file type and grant permission to modify the file.

18. The apparatus of claim 16, comprising a transceiver, the client lock manager to determine the file type is a locking required or a locking preferred file type, establish a network connection to a locking server using the transceiver, request locking instructions from the locking server over the network connection, and provide a response to the request to modify based on the locking instructions.

19. The apparatus of claim 16, comprising a transceiver, the client lock manager to determine the file type is a locking required file type, determine a network connection to a locking server is not available, and deny permission to modify the file.

20. The apparatus of claim 16, comprising a transceiver, the client lock manager to determine the file type is a locking preferred file type, determine a network connection to a locking server is not available, and grant permission to modify the file.

* * * * *